(12) United States Patent
Habermann et al.

(10) Patent No.: US 8,977,590 B2
(45) Date of Patent: Mar. 10, 2015

(54) FRONT END INTELLIGENCE FOR MONITORING BACK END STATE

(76) Inventors: Joe Habermann, Minneapolis, MN (US); Stephen P. Lord, Prior Lake, MN (US)

(*) Notice: Subject to any disclaimer, the term of this patent is extended or adjusted under 35 U.S.C. 154(b) by 715 days.

(21) Appl. No.: 13/267,057

(22) Filed: Oct. 6, 2011

(65) Prior Publication Data

US 2013/0091092 A1    Apr. 11, 2013

(51) Int. Cl.
*G06F 17/30* (2006.01)
*G06F 17/00* (2006.01)
*G06F 11/14* (2006.01)

(52) U.S. Cl.
CPC ...... *G06F 17/30227* (2013.01); *G06F 11/1438* (2013.01)
USPC ............................ 707/609; 707/651; 707/640

(58) Field of Classification Search
CPC ..... G06F 3/067; G06F 3/0605; G06F 3/0631; G06F 3/0647; G06F 17/30082; G06F 3/0613; G06F 11/2064; G06F 17/30206; G06F 17/30215; G06F 11/2082; G06F 11/3485; G06F 17/30088; G06F 17/30156; G06F 17/302; G06F 17/30067; G06F 17/30241

USPC .................................................. 707/651, 640
See application file for complete search history.

(56) References Cited

U.S. PATENT DOCUMENTS 7,707,151 B1 *    4/2010    Blumenau et al. ............ 711/165

* cited by examiner

*Primary Examiner* — Yicun Wu

(57) ABSTRACT

Apparatus, methods, and other embodiments associated with providing front end intelligence for monitoring back end state are described. One example method includes controlling a first entity to request that a second entity perform a multi-state stateful operation (e.g., file create). The method includes receiving notice from the second entity that the stateful operation has attained a first state (e.g., partial file create complete) and, upon receiving the notice, maintaining, at the first entity, information (e.g., sequence number, metadata) associated with the stateful operation. The method also includes, upon receiving notice that the second entity lost state before the stateful operation attained a second state, selectively providing to the second entity a portion of the information maintained at the first entity, and upon receiving notice from the second entity that the stateful operation has attained the second state, terminating maintaining the information associated with the stateful operation.

17 Claims, 9 Drawing Sheets

FRONT END INTELLIGENCE FOR MONITORING BACK END STATE

BACKGROUND

Some file systems support a single stand alone computer. Other file systems support multiple computers over a network. While race conditions may exist for a file system supporting a single stand alone computer, it is more likely that race conditions may exist when a file system supports multiple computers at the same time.

StorNext is a shared disk file system that may support multiple computers and processes at the same time. StorNext Storage Manager is a hierarchical storage management system. StorNext and the StorNext Storage Manager have worked together to facilitate numerous applications and to support numerous different environments. However, during these interactions a race condition may have arisen that could potentially lead to inconsistent states between clients (e.g., StorNext front end) and servers (e.g., StorNext back end).

More generally, shared storage device file systems with client server architectures that perform multi-step stateful operations may have their consistency depend on the successful avoidance of the consequences of race conditions.

The StorNext File System is a shared disk file system. StorNext is provided by Quantum Corporation. StorNext is installed on hosts that are connected to the same disk array in a storage area network (SAN). Client systems do not have to run the same operating system to access a StorNext shared file system. In some examples, StorNext facilitates producing environments that include, but are not limited to, an environment where large files (e.g., satellite image data) are shared by users without network delays, and an environment where a file is made available for access by multiple readers starting at different times (e.g., on-demand movie).

The StorNext file system supports Quantum's StorNext Storage Manager. Storage Manager is a hierarchical storage management system that is used for data archival with a back end robotic tape library. StorNext data management software provides high-speed content sharing and cost-effective data archiving. StorNext facilitates building an infrastructure that consolidates resources so that workflow runs faster and operations cost less. StorNext offers data sharing and retention in a single solution. Even in heterogeneous environments, data is easily accessible to different hosts. SAN connectivity facilitates high performance while local area network (LAN) connectivity using clustered gateway systems facilitates cost efficiency and fan-out.

StorNext may run on many computers at the same time. StorNext front end clients may communicate with StorNext back end servers and server processes. The back end may include a server and a metadata controller. The metadata controller may manage information about files that are available to users of the shared disk file system. In one configuration, clients may be limited to reading files and writing files and thus may not be allowed to create files on their own behalf. Instead, clients may rely on a back end server or process to actually create a file. A client may request that a file be created by a back end server or process. In this application, terms including "actually create a file", "fully created", and "total file creation completion" refer to a state associated with the existence of a file on durable media.

Conventionally, a back end server or process may have been very aggressive in responding to the front end about partial completion of the file create so that the front end client does not have to wait too long to move on to its next task (e.g., writing the newly created file). This back end aggressiveness may lead to a condition where the back end has reported to a front end that a file has been created when in fact the file has not yet been fully created. While this condition exists, the file may only exist as its metadata description in a volatile memory (e.g., back end random access memory (RAM)) at the back end. While this condition exists, a back end crash or other loss of state at the back end after reporting initial creation but before actually completing creation could yield inconsistent states between front end clients and back end servers. An inconsistent state could lead, for example, to a front end trying to read from or write to a file that doesn't actually exist. The condition may exist because the back end may create the file on behalf of the front end by establishing a metadata description in volatile memory and then scheduling the writing of the metadata to non-volatile memory for a later time.

To reduce the period of time during which a crash could yield the inconsistent state, the back end may be very aggressive in pushing metadata to disk to complete the file creation. However, very aggressive metadata pushing may introduce additional inefficiencies. For example, a less than block or page sized write may be performed, which can be very inefficient. Another conventional approach to minimizing the race condition was to force the front end to wait for the back end to actually create the file. This approach may be unacceptable when a large number of files are being created in a short period of time during, for example, a backup procedure.

BRIEF DESCRIPTION OF THE DRAWINGS

The accompanying drawings, which are incorporated in and constitute a part of the specification, illustrate various example systems, methods, and other example embodiments of various aspects of the invention. It will be appreciated that the illustrated element boundaries (e.g., boxes, groups of boxes, or other shapes) in the figures represent one example of the boundaries. One of ordinary skill in the art will appreciate that in some examples one element may be designed as multiple elements or that multiple elements may be designed as one element. In some examples, an element shown as an internal component of another element may be implemented as an external component and vice versa. Furthermore, elements may not be drawn to scale.

DETAILED DESCRIPTION

Figure 1:
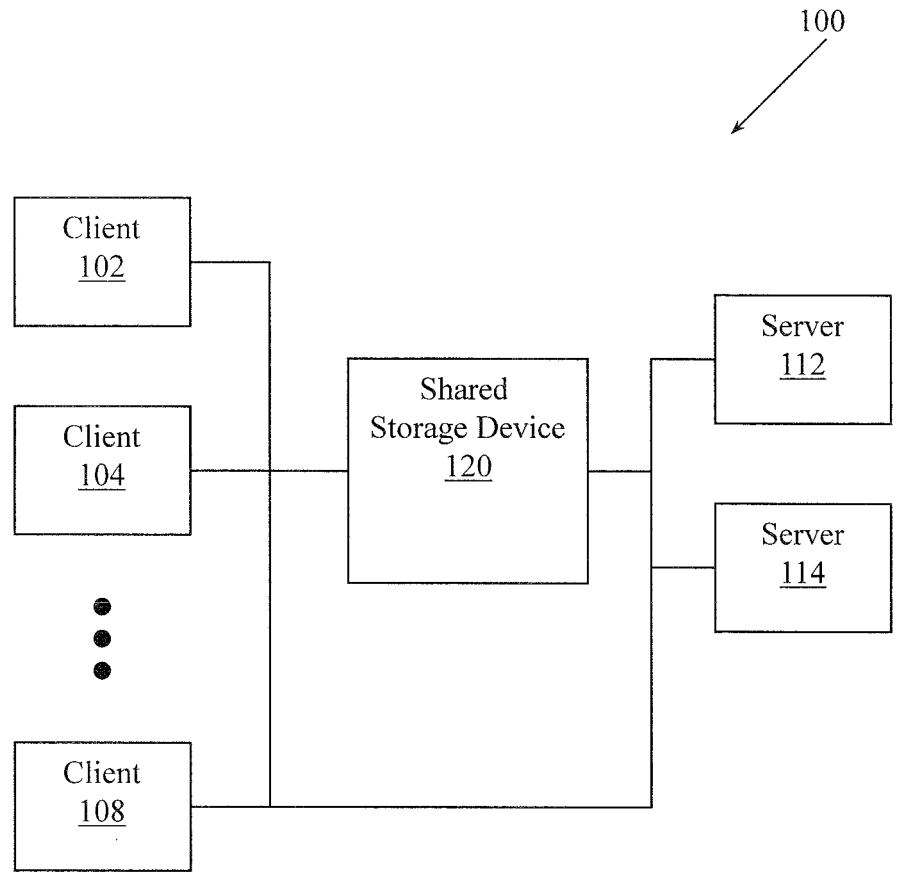
FIG. 1 illustrates an example front end, back end environment where an inconsistent state may be created.

Example systems and methods provide front end intelligence for monitoring back end state in a shared storage device (e.g., disk) file system. In one embodiment, a fully created file identifier approach is agreed on between a front end (e.g., client, StorNext client) and a back end (e.g., server, server process, StorNext metadata controller). The fully created file identifier may be, for example, a sequence number. The fully created file identifier approach reduces the urgency for the back end to push metadata so aggressively to disk while allowing the front end client to move on to subsequent tasks. Recall that the urgency to push metadata so aggressively resulted in inefficiencies. The fully created identifier approach also reduces the need for the front end to wait for the back end to complete file creation by storing file metadata in non-volatile memory (e.g., disk).

Using a sequence number approach, a back end may generate a sequence number when it begins creating a file for a client. The sequence number may take forms including, but not limited to, universally unique identifiers (UUID), globally unique identifiers (GUID), a locally unique number, a locally unique value, an integer, a number that is a member of an ascending set, a number that is a member of a descending set, a number that is a member of a consecutive set of numbers, a number that is a member of a non-consecutive set of numbers, a value associated with a global clock, a value associated with a system clock, and a value associated with a local clock. When initial file creation actions have been completed, the back end may report the sequence number and other file creation information (e.g., selected initial metadata) to the requesting client. The requesting client can then track that sequence number until the back end provides information from which the client can determine that the file associated with the sequence number has been fully created. Initial back end file creation may be complete when metadata for the file has been created and/or manipulated in a volatile back end memory. Full creation at the back end may be complete when the metadata for the file has been stored in a non-volatile memory (e.g., disk, tape, solid state device) and not just in a volatile memory on the back end that is vulnerable to state loss. When the back end file creation is complete, the back end may report information to the client from which back end file creation completion can be determined so that the client can stop tracking the partially complete file creation. The sequence number tracking approach that stores some file information at the client during the time during which the condition exists allows the back end to, for example, aggregate and/or arrange metadata to be pushed more efficiently to non-volatile memory.

In one example sequence number tracking approach, if the back end loses state (e.g., crashes) before a file is fully created, then when the back end regains state (e.g., comes back up), the back end may report to a front end the loss of state and the last file it fully created. A front end may then realize that a file that was in the partially created state has not been fully created and that the back end may not know that a file creation was compromised by the loss of state. The front end may therefore send to the back end information that was being maintained at the front end about a file that was reported as being partially created but not reported as being fully created. The information may include, for example, the metadata provided to the front end by the back end upon reporting initial file creation. In one embodiment, the information may also include writes, changes, deletes, and so on, that may have been made to the file and stored at the front end or elsewhere while the file is partially created but not yet fully created at the back end. The back end may therefore be able to decide whether to partially create the file a second time and to fully create the file for a first time. While a sequence number is described, more generally an identifier may be employed. Similarly, while a file create is described, more generally a stateful operation may be protected using the front end intelligence for monitoring back end state.

Since the back end may write metadata for several partially created files as part of a single write, in different embodiments the back end may send notifications for the several files or may send a single notification that allows the full creation of the several files to be ascertained by a front end. For example, when a sequence number approach is taken, the back end may report the highest sequence number for the several files whose creation was completed. A front end may be able to determine that a file it was tracking that had a lower sequence number than the highest sequence number reported is now complete because of the higher value of the sequence number. While "higher" and "lower" are described, in different embodiments, sequences may count forward or backwards, may ascend or retreat, and may advance or retreat in different fashions including, but not limited to, linearly, non-linearly, consecutively, non-consecutively, sequentially, and non-sequentially.

When the front end determines that the file has been fully created, the front end knows that the transient condition is over and that information it had been holding in case the file needed to be recreated is no longer needed. Therefore, in one embodiment, upon learning that a file in a transient state being tracked at a front end has been fully created, the front end may stop tracking the file and may delete information that the front end was storing about the file in case the front end needed to help the back end recreate the file.

More generally, when the front end determines that a multi-state stateful operation that has been identified as having achieved a first state (e.g., partial completion) has now achieved a second state (e.g., total completion) then the front end may stop tracking the stateful operation and can release (e.g., delete) information, metadata, and/or data that the front end was maintaining while tracking the stateful operation.

In one example sequence number tracking approach, if the back end loses state (e.g., crashes) before a file is fully created, then when the back end regains state (e.g., comes back up), the front ends (clients) may attempt to replay creates that remain in their lists. Clients maintain a list of files that are "re-create candidates." In one embodiment, the list is pruned based on a sequence number that is returned from the server during normal operations. The sequence number indicates which operations have made it to persistent storage. The sequence number may returned in response to create requests and using other mechanisms. When the server comes back up, a front end may then realize that a file that was in the partially created state has not been fully created and that the back end may not know that a file creation was compromised by the loss of state. The front end may therefore try to replay the creates that remain in their list. If the server receives a create request that the server knows completed, then the server may simply ignore that request. If the server receives a create request that did not complete, then the server may perform that replayed create. The server may therefore be able to decide whether to partially create the file a second time or to fully create the file for a first time. While a sequence number is described, more generally an identifier may be employed. Similarly, while a file create is described, more generally a stateful operation may be protected using the front end intelligence for monitoring back end state.

FIG. 1 illustrates an example environment 100 where an inconsistent state may be created when a multi-state operation is performed in a shared storage device file system. The environment 100 includes front ends that may include one or more clients as illustrated by client 102 and clients 104 through 108. While multiple clients are illustrated, environment 100 could have only a single client. Thus, in one embodiment, a "front end" could include a single client. The environment 100 also includes a back end that may include one or more servers as illustrated by server 112 and server 114. While two servers are illustrated, a greater or lesser number of servers may be employed. A server may include, for example, a metadata controller that is configured to manage metadata creation and/or storage for a file that is used in the environment 100.

The environment 100 may also include a shared storage device 120. While a single device 120 is illustrated, multiple devices may be employed. Additionally, while a single device 120 is illustrated, the single device could be an array (e.g., an array of disks). The clients, servers, and shared storage device 120 in environment 100 may employ a shared storage device file system. In one embodiment, the clients may be able to read/write files stored on the shared storage device 120 but only the servers may be able to create files. Therefore, the shared storage device file system may be configured to perform a file create as a multi-state operation. In a first state, a server may create the metadata for a file and store that metadata in volatile memory that is susceptible to state loss. Initial writes may similarly be buffered or stored in local or volatile memory before a shared or non-volatile location becomes available upon total file create completion. In a second state, the server may move the metadata to non-volatile memory (e.g., disk) that is less susceptible to state loss. Example apparatus and methods facilitate providing front end intelligence for monitoring the back end state to prevent undesired consequences if the back end loses state in between the first state and the second state. Losing state may occur, for example, if a back end loses connectivity to a storage device, loses connectivity to a network, crashes, is destroyed, experiences an operating system failure, and so on.

Figure 2:
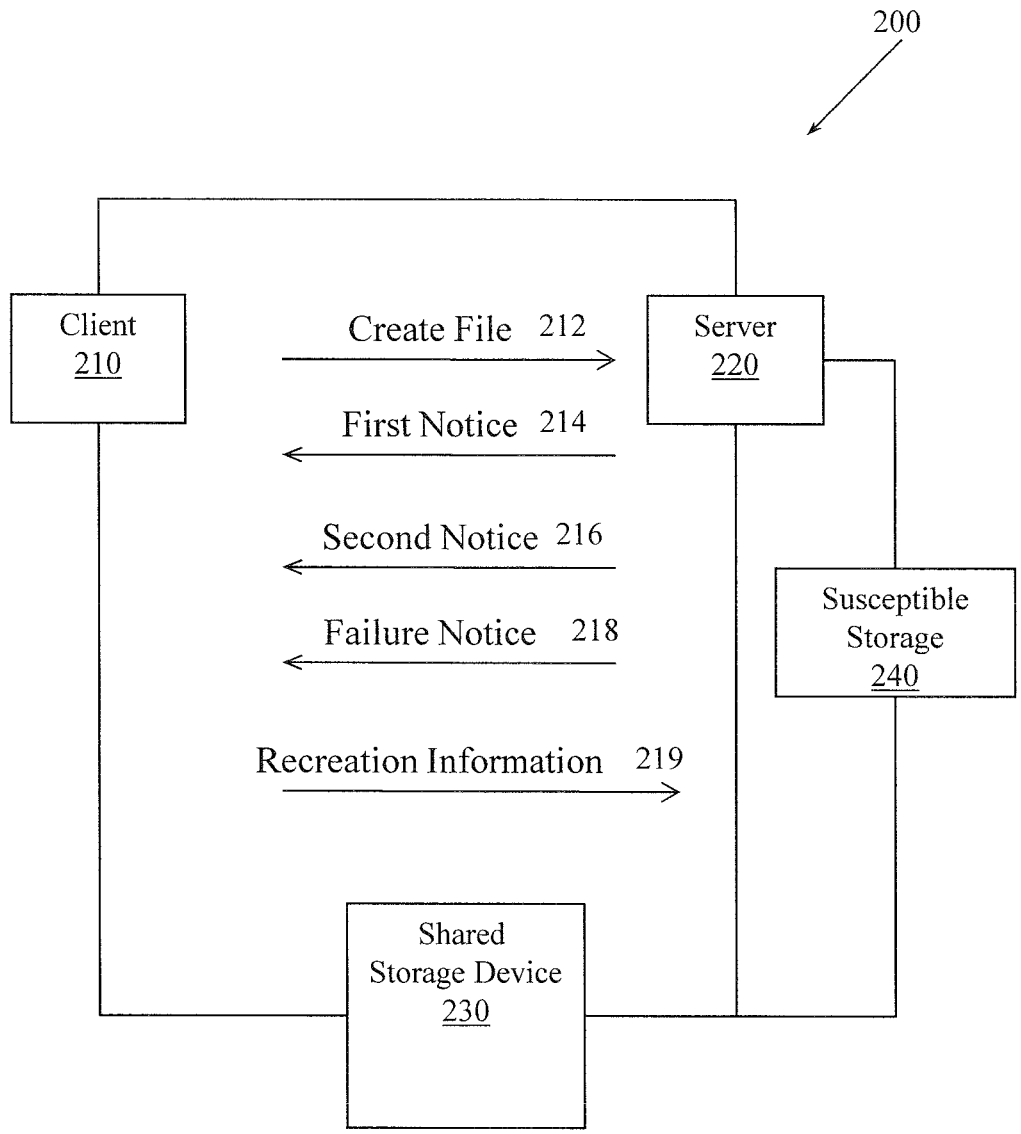
FIG. 2 illustrates a data flow associated with a method for reducing the likelihood of an inconsistent state being created.

FIG. 2 illustrates a data flow 200 associated with a method for reducing the likelihood of an inconsistent state being created in a shared storage device file system. A client 210 and a server 220 may exchange messages associated with a multi-state file system operation (e.g., file create). A first state of the multi-state file system operation may be associated with data and/or metadata being stored in a storage 240 that may be susceptible to or compromised by a state loss in the server 220. A second state of the multi-state file system operation may be associated with data or metadata being stored in a shared storage device 230 that is less susceptible to or less exposed to state loss in the server 220 than items stored in storage 240. In one example, storage 240 and/or storage device 230 may be data stores and the data or metadata may be communicated between the server 220 and the data store(s) using a computer communication.

The multi-state operation may be commenced when client 210 sends message 212 to server 220 requesting that a file be created. If the server 220 is able to advance the file create to a first state where, for example, metadata is stored on susceptible storage 240, then server 220 may provide a first notice 214, to the client 210. The first notice 214 may include, for example, metadata that was stored in the susceptible storage 240 and an identifier. The identifier may identify the file created, the create file request 212, and so on. The identifier may be, for example, a sequence number.

If the server 220 is able to advance the file create to a second state where the metadata is stored on the shared storage device 230, then the server 220 may provide the second notice 216 to the client 210. The second notice 216 may also include an identifier. This identifier may identify the create file request 212, the file created, the metadata associated with the file, and so on. However, this identifier may identify none of those things. Instead, when the sequence number approach is employed, the identifier may identify a most recently successful file create completion, a later occurring successful file create completion, and so on. Thus, the second notice 216 may include a sequence number from which the client 210 can determine whether a file create operation that the client 210 is tracking was completed successfully.

If the server 220 is not able to advance the file create to the second state, then the server 220, or some other entity acting on behalf of the server 220 may provide a failure notice 218 to the client 210. The failure notice 218 may be provided when the server 220 loses state, when the server 220 regains state, when the server 220 crashes, when the server 220 loses connectivity, when the server 220 comes back up, when the server 220 regains connectivity, and at other times. The failure notice 218 may include an identifier that facilitates having the client 210 determine whether the create file operation commenced by the create file request 212 progressed to the second state.

The client 210 may provide a recreation information message 219 to the server 220. The recreation information message 219 may include, for example, information that was provided from the server 220 to the client 210 in the first notice 214. Thus, the client 210 may be able to provide information to the server 220 that helps the server 220 regain its state and that helps the server 220 restart the file create operation commenced by the create file message 212.

Figure 3:
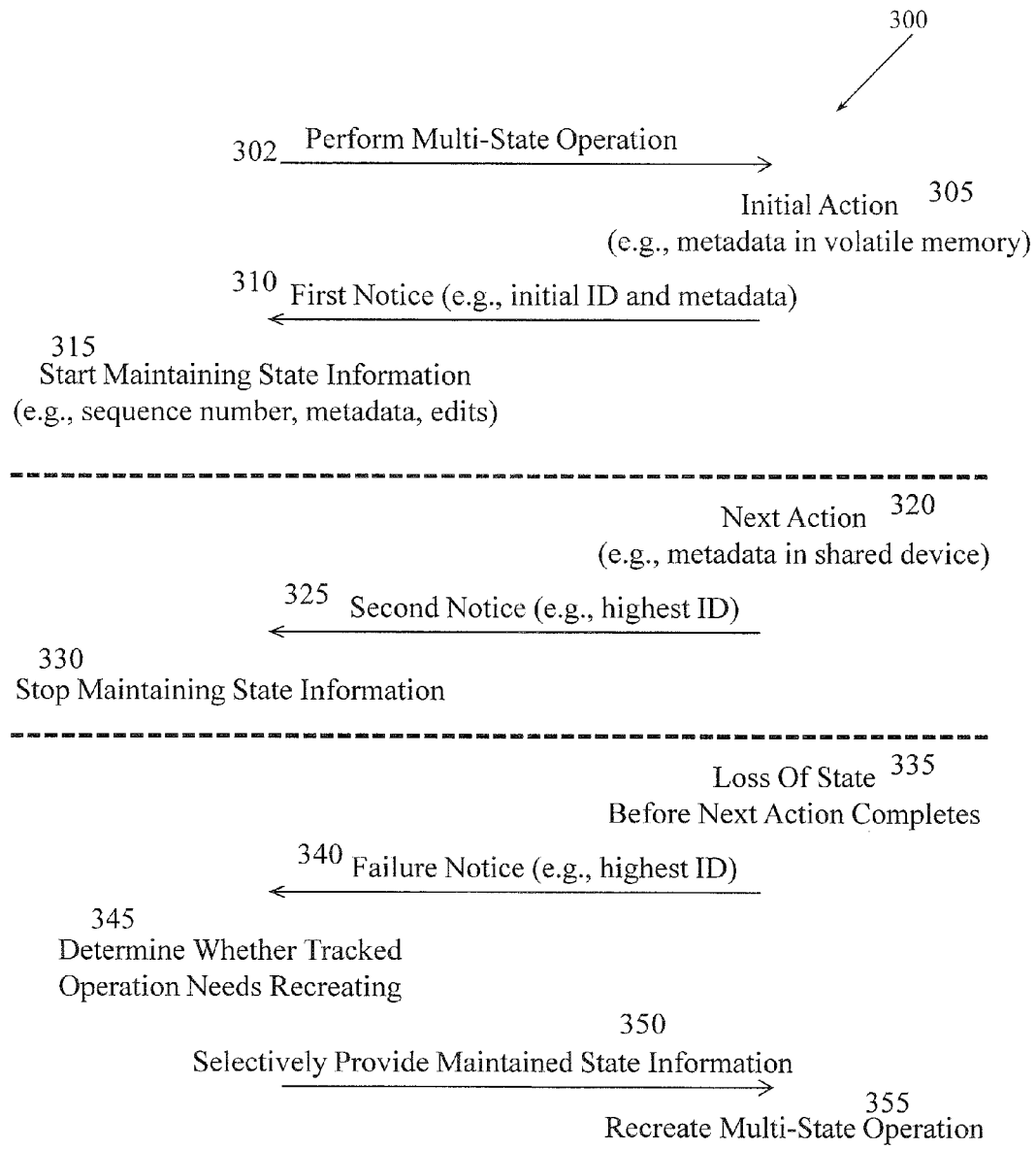
FIG. 3 illustrates an example message flow associated with providing front end intelligence for monitoring back end state.

FIG. 3 illustrates an example message flow 300 associated with providing front end intelligence for monitoring back end state. Message flow 300 includes a first message 302 that travels from a requester to a performer. The first message 302 requests that the performer perform a multi-state or multi-step operation. One example multi-state or multi-step operation is a file create. In response to message 302, the performer may perform, at 305, the initial action. In the case of the file create operation, the initial action may include writing metadata to a volatile memory. The metadata may initially be written to a volatile memory that efficiently handles small writes so that the requester can be notified that the operation has at least partially succeeded so that the requester can stop waiting and move on. At a time convenient to the performer, the metadata may be moved from the volatile memory to a non-volatile memory (e.g., disk, SSD) that handles larger (e.g., pooled, page, block) writes efficiently. In this way, storage devices can be used in more optimal ways where random access storage (e.g., RAM) that handles small writes is used for a first activity while other storage (e.g., disk, SSD) that handles block or page writes is used for a second activity.

Message flow 300 includes a first notice 310 that is provided from the performer to the requester. The first notice 310 may include, for example, an identifier and metadata. The metadata may be provided to the requester so that the requester can have some intelligence about what is happening at the performer and so that if things don't go exactly as planned at the performer the requester may be able to help reboot, restart, or otherwise reconfigure the performer. The identifier may be, for example, an initial identifier configured to identify either the initial action 305 or that a later occurring action has occurred that implicitly identifies that a subsequent action desired for the item processed by the initial action 305 has completed successfully.

At 315, the requester may start maintaining state information that may be useful to the performer. The state information may include, for example, the metadata provided in first notice 310, an identifier (e.g., sequence number) provided in first notice 310, edits associated with the item acted on by initial actions 305, and so on.

Message flow 300 identifies two different possibilities: a successful completion of the actions initiated by request 302 as illustrated by next action 320, second notice 325, and action 330; and a loss of state 335 followed by notice 340, action 345, provision of state information 350, and recreation of state at 355.

When next action 320 is successful completion of the action initiated by request 302 (e.g., metadata stored in shared device that is not susceptible to state loss in performer), then second notice 325 may notify the requester that the operation has achieved a desired state and thus the requester may, at 330, stop maintaining information useful for resolving a transient state. In one example, second notice 325 may identify the actual operation that was just completed successfully at 330. In another example, second notice 325 may identify some other operation that was completed successfully at 330. In the first case, the requester can directly determine whether the requester was tracking that operation. In the second case, the requester may be able to indirectly determine that an operation the requester was tracking completed successfully due to the report of a later reported operation completing successfully. For example, if the requester is tracking operation #117, and learns that operation #117 has completed successfully, then the requester may stop tracking operation #117. Additionally, if the requester learns that, operation #119 has completed successfully, then the requester may determine that operation #117 also completed successfully.

When the performer loses state at 335 before the next action associated with request 302 completes, then the requester and the performer may have inconsistent state information. The requester may think that the request 302 is proceeding normally while the performer may have lost track completely of request 302. Thus, when the performer is able to, the performer may provide a failure notice 340 that identifies that last action it successfully completed or some action that it successfully completed. When a requester receives this failure notice 340, the requester may be able to determine whether a request that it was tracking completed successfully. If the failure notice 340 indicates that the action associated with request 302 completed successfully, then the requester can actually treat the failure notice 340 like a second notice 325 and stop tracking the action. If, however, the failure notice 340 indicates that the action associated with request 302 did not complete, then the requester may, at 350, selectively provide maintained state information. The maintained information may include, for example, an identifier, the metadata provided in first notice 310, and other information. Given this information the performer may then, at 355, attempt to recreate the multi-state operation.

Some portions of the detailed descriptions that follow are presented in terms of algorithms and symbolic representations of operations on data bits within a memory. These algorithmic descriptions and representations are used by those skilled in the art to convey the substance of their work to others. An algorithm, here and generally, is conceived to be a sequence of operations that produce a result. The operations may include physical manipulations of physical quantities. Usually, though not necessarily, the physical quantities take the form of electrical or magnetic signals capable of being stored, transferred, combined, compared, and otherwise manipulated in a logic, and so on. The physical manipulations create a concrete, tangible, useful, real-world result.

It has proven convenient at times, principally for reasons of common usage, to refer to these signals as bits, values, elements, symbols, characters, terms, numbers, and so on. It should be borne in mind, however, that these and similar terms are to be associated with the appropriate physical quantities and are merely convenient labels applied to these quantities. Unless specifically stated otherwise, it is to be appreciated that throughout the description, terms including processing, computing, determining, and so on, refer to actions and processes of a computer system, logic, processor, or similar electronic device that manipulates and transforms data represented as physical (electronic) quantities.

Example methods may be better appreciated with reference to flow diagrams. For purposes of simplicity of explanation, the illustrated methodologies are shown and described as a series of blocks. However, it is to be appreciated that the methodologies are not limited by the order of the blocks, as some blocks can occur in different orders and/or concurrently with other blocks from that shown and described. Moreover, less than all the illustrated blocks may be required to implement an example methodology. Blocks may be combined or separated into multiple components. Furthermore, additional and/or alternative methodologies can employ additional, not illustrated blocks.

Figure 4:
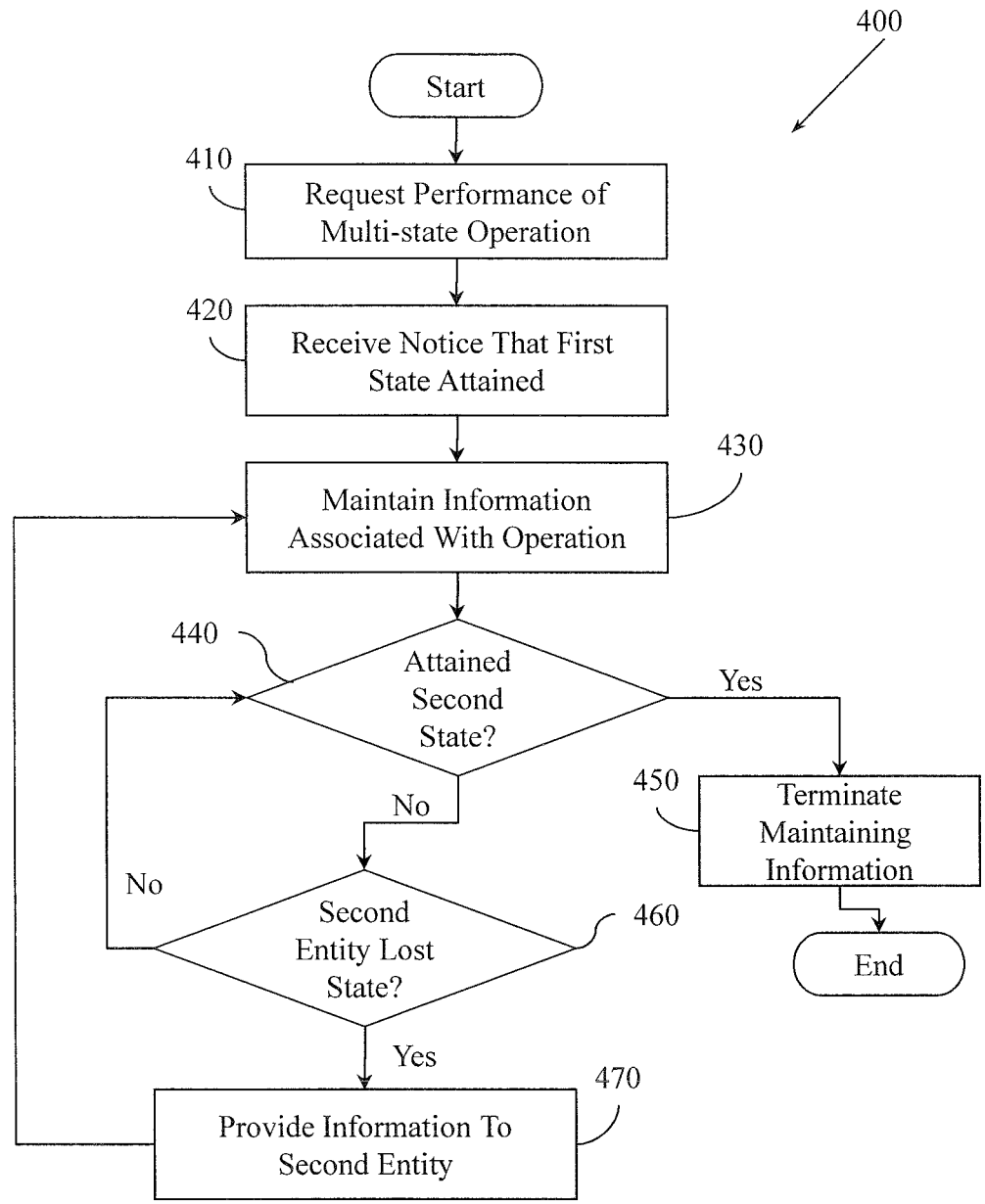
FIG. 4 illustrates an example client side method associated with reducing the likelihood of an inconsistent state being created by providing front end intelligence for monitoring back end state.

FIG. 4 illustrates an example client side or front end method 400 associated with reducing the likelihood of an inconsistent state being created by providing front end intelligence for monitoring back end state. Method 400 includes, at 420, receiving, at a first entity (e.g., client, front end), a first notice from a second entity (e.g., server, back end) that a multi-state stateful operation has attained a first state in the second entity. In one embodiment, the multi-state stateful operation may be a file create operation. In this embodiment, the first state may be a partial file creation completion state where metadata associated with a file is established in volatile memory associated with the second entity. This first state may be susceptible to state loss on the second entity because the volatile memory may lose its data if the second entity is unable to perform as desired. In this embodiment, the second state may be a total file creation completion state where metadata associated with the file is established in a non-volatile storage device associated with the second entity and where the second state is less susceptible to state loss on the second entity. The second state may be less susceptible to state loss because the metadata may be recoverable even if the server is unable to perform as desired.

In one embodiment, the first notice received at 420 from the second entity comprises an identifier of the stateful operation. The identifier may be, for example, a sequence number. A sequence number can be a number or value that allows determining order in a sequence of other numbers or values. A sequence number may be a part of a consecutive or non-consequence sequence, an increasing or decreasing sequence, or other collections of numbers or values from which order can be determined.

Method 400 also includes, at 430, upon receiving the first notice, beginning maintenance, at the first entity, of information associated with the stateful operation. In one embodiment, when the stateful operation is a file system operation, the first notice may include metadata describing a file associated with the file system operation. In this embodiment, the information maintained at the first entity may include the identifier and/or the metadata. In one embodiment, the first entity may begin file operations (e.g., writes) before receiving notice that the file system operation is fully complete. In this embodiment, the first entity may maintain local copies of data configured to recreate the file operations.

Method 400 also includes, at 440, determining whether the second state was attained. If the determination at 440 is yes, then method 400 proceeds, at 450, to terminate maintenance of the information associated with the stateful operation at the first entity. Terminating the maintenance may include, for example, deleting the maintained information, deleting a reference to the maintained information, and so on. If the determination at 440 is no, method 400 proceeds, at 460, to determine whether the second entity has lost state. If the determination at 460 is no, then the method 400 may simply continue to wait. While a loop is shown from decision 460 to decision 440, other waiting approaches (e.g., sleep/wakeup, interrupt) may be employed.

If the determination at 460 is yes, then method 400 may proceed, at 470, to selectively provide from the first entity to the second entity a portion of the information maintained at the first entity. In one example, determining at 460 that the second entity lost state before the stateful operation attained a second state includes receiving an identifier from the second entity. In one example, the identifier may identify the last multi-state stateful operation completed by the second entity before the second entity lost state. In another example, the identifier may identify some other multi-state stateful operation completed by the second entity before the second entity lost state. In either case, the first entity may be able to determine whether the operation associated with the notice of the first state being attained was completed.

In one embodiment, method 400 may begin, at 410, by controlling the first entity to request that the second entity perform the multi-state stateful operation.

In different embodiments, the first entity and the second entity may have different forms. In one embodiment, the first entity may be a client configured to use a shared storage device file system and the second entity may be a server configured to use the shared storage device file system. In this embodiment, the server may be configured to perform the stateful operation. In another embodiment, the first entity may be a front end configured to use a shared storage device file system, the second entity may be a back end configured to use the shared storage device file system, and the back end may be configured to perform the stateful operation. Mixed configurations may also be encountered. Thus, in different embodiments the first entity may be one of, a front end configured to use a shared storage device file system, a client configured to use the shared storage device file system, and a process configured to use the shared storage device file system, while the second entity is one of, a back end configured to use the shared storage device file system, a server configured to use the shared storage device file system, a server process configured to use the shared storage device file system, and a metadata controller configured to manage the shared storage device file system. In these various embodiments the second entity may be configured to perform the stateful operation.

While FIG. 4 illustrates various actions occurring in serial, it is to be appreciated that various actions illustrated in FIG. 4 could occur substantially in parallel. By way of illustration, a first process could receive notices, a second process could maintain state, and a third process could provide information. While three processes are described, it is to be appreciated that a greater and/or lesser number of processes could be employed and that lightweight processes, regular processes, threads, and other approaches could be employed.

In one example, a method may be implemented as computer executable instructions. Thus, in one example, a computer-readable medium may store computer executable instructions that if executed by a machine (e.g., processor) cause the machine to perform method 400. While executable instructions associated with method 400 are described as being stored on a computer-readable medium, it is to be appreciated that executable instructions associated with other example methods described herein may also be stored on a computer-readable medium.

Figure 5:
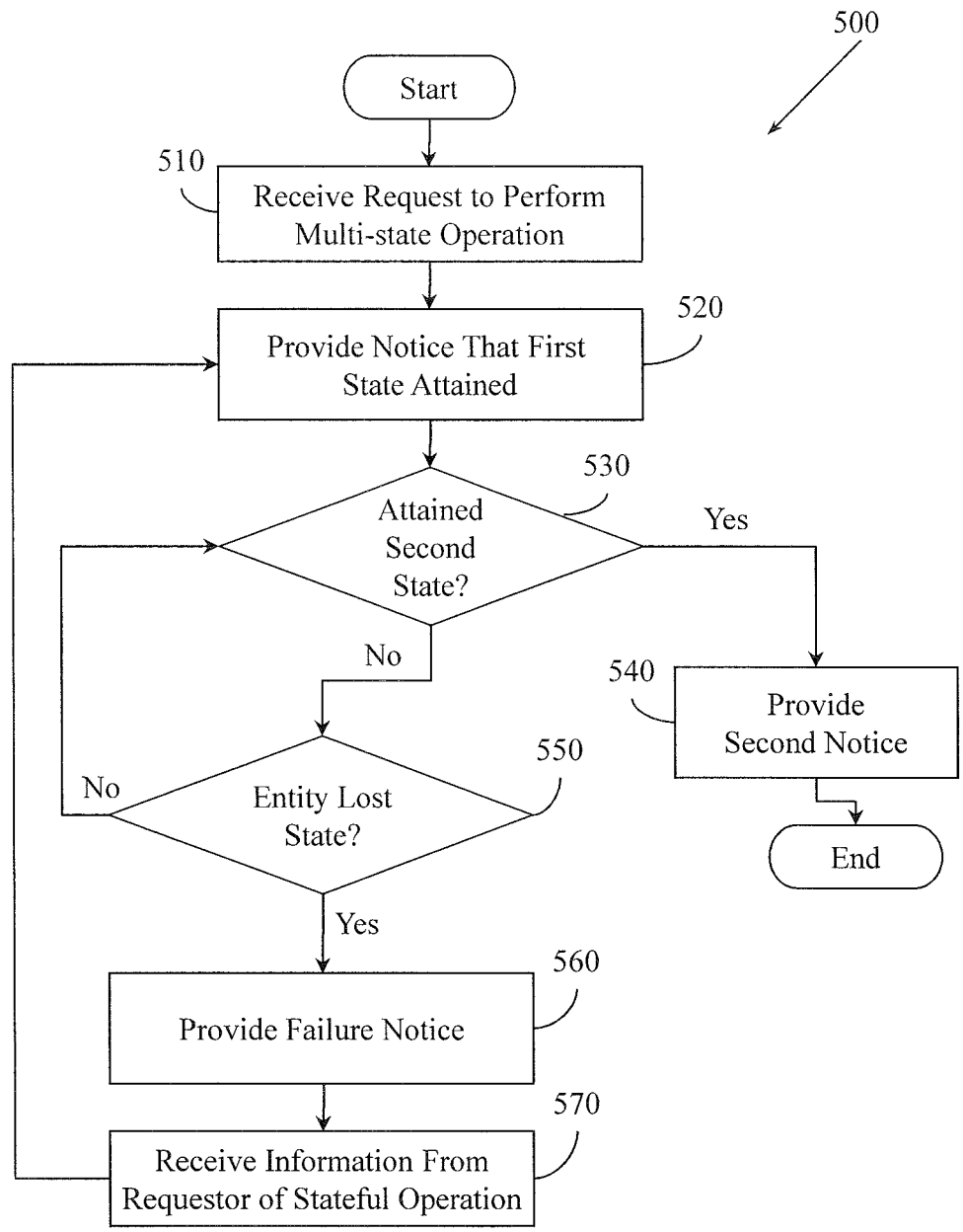
FIG. 5 illustrates an example server side method associated with reducing the likelihood of an inconsistent state being created by providing front end intelligence for monitoring back end state.

FIG. 5 illustrates an example server side method 500 associated with reducing the likelihood of an inconsistent state being created by providing front end intelligence for monitoring back end state. Method 500 includes, at 510, receiving from a first entity (e.g., client, front end), a request that the second entity (e.g., server, back end) perform a multistate stateful operation (e.g., file create).

Method 500 also includes, at 520, providing first notice to the first entity from the second entity that the stateful operation has attained a first state. The first notice may include, for example, a sequence number and metadata.

Method 500 also includes, at 530, determining whether the operation has attained a second state. If the determination at 530 is yes, then method 500 proceeds, at 540, to provide second notice to the first entity from the second entity that the stateful operation has attained the second state. The second notice may include, for example, the sequence number associated with the first notice or a different sequence number related to the sequence number provided in the first notice and from which resolution of the action associated with the sequence number provided in the first notice can be determined.

If the determination at 530 is no, then method 500 proceeds, at 550, to determine whether the second entity lost state. If the determination at 550 is no, then method 500 may wait until either the second state is attained or state is lost. If the determination at 550 is yes, then method 500 proceeds, at 560, to provide failure notice to the first entity that the second entity lost state before advancing the stateful operation from the first state to the second state. In one embodiment, the failure notice may be provided from the second entity while in another embodiment the failure notice may be provided by an actor other than the second entity. In one embodiment, the failure notice may include a sequence number.

Method 500 also includes, at 570, receiving, at the second entity, from the first entity, information from which the second entity can restart the stateful operation. The information may include, for example, metadata previously provided form the second entity to the first entity.

In different embodiments, the first entity and the second entity may take different forms. Thus, the first entity can take forms including, but not limited to, a front end configured to use a shared storage device file system, a client configured to use the shared storage device file system, and a process configured to use the shared storage device file system. The second entity can take forms including, but not limited to, a back end configured to use the shared storage device file system, a server configured to use the shared storage device file system, a server process configured to use the shared storage device file system, and a metadata controller configured to manage the shared storage device file system. In these different embodiments, the second entity may be configured to perform the stateful operation.

In one embodiment, the multi-state stateful operation may be a file create operation. In this embodiment, the first state may be a partial file creation completion state where metadata associated with a file is established in a location (e.g., volatile memory) associated with the second entity. The first state or the location may be susceptible to state loss on the second entity. In this embodiment, the second state may be a total file creation completion state where metadata associated with the file is established in a location (e.g., non-volatile storage device) associated with the second entity. The second state or the location may not be susceptible to state loss on the second entity.

Figure 6:
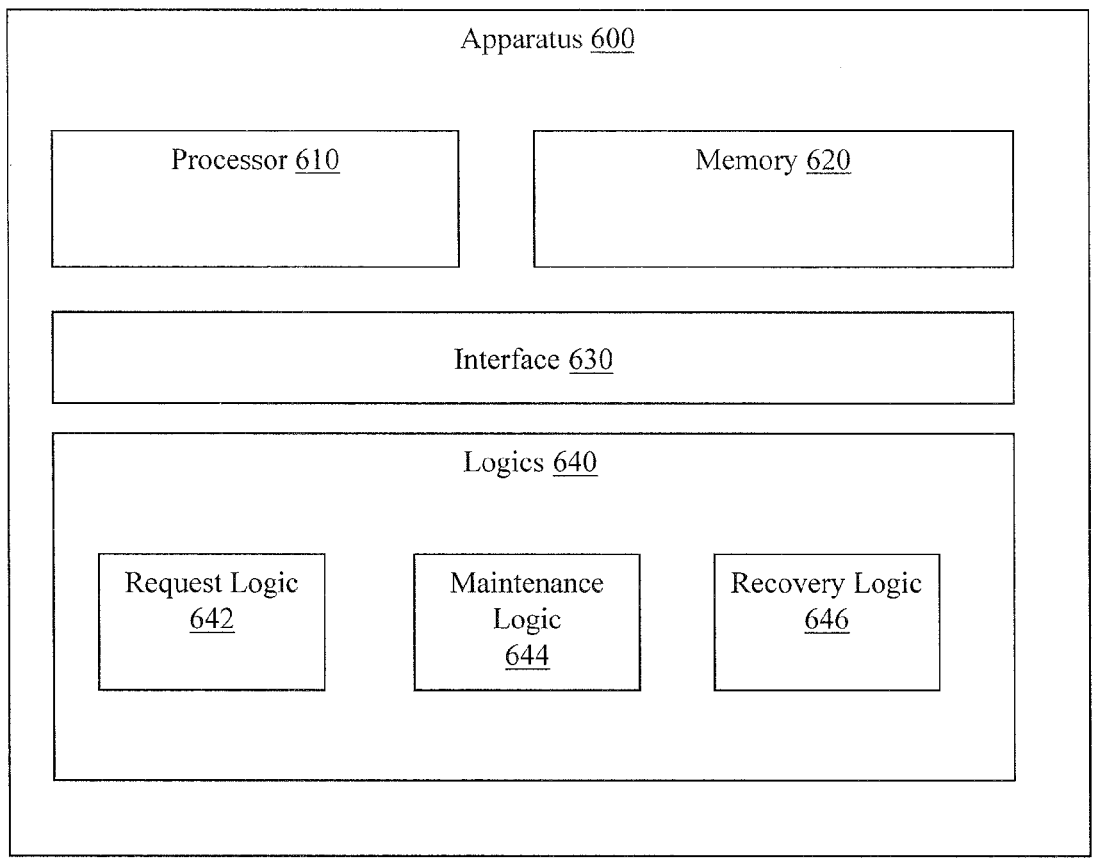
FIG. 6 illustrates an example client associated with reducing the likelihood of an inconsistent state being created by providing front end intelligence for monitoring back end state.

FIG. 6 illustrates an example apparatus 600 associated with reducing the likelihood of an inconsistent state being created by providing front end intelligence for monitoring back end state. Apparatus 600 includes a processor 610, a memory 620, logics 640, and an interface 630 configured to connect the processor 610, the memory 620, and the logics 640. Apparatus 600 may be a front end apparatus (e.g., a client apparatus) communicating with and relying on a back end apparatus (e.g., server apparatus 700, FIG. 7) that is providing services for a shared storage device file system.

In one embodiment, the set of logics 640 includes a request logic 642, a maintenance logic 644, and a recovery logic 646. The request logic 642 may be configured to request that a shared storage device file system server perform a multi-step file system operation (e.g., file create) on a file. The multi-step file system operation may progress through a first state and a second state. For example, the first state may represent a partial file creation completion state where metadata associated with a file is established in a location that can be negatively impacted by a problem on the server. The second state may represent a total file creation completion state where metadata associated with the file is established in a location that may not be negatively impacted by a problem on the server.

The maintenance logic 644 may be configured to maintain information suitable for re-establishing state for the multi-step file system operation in the shared storage device file system server. The information may include a sequence number associated with the file system operation, metadata describing a file associated with the file system operation, and data associated with the file associated with the file system operation.

The recovery logic 646 may be configured to provide the information suitable for re-establishing state to the shared storage device file system server upon determining that the shared storage device file system server lost state before the multi-step file system operation achieved a desired state.

Figure 7:
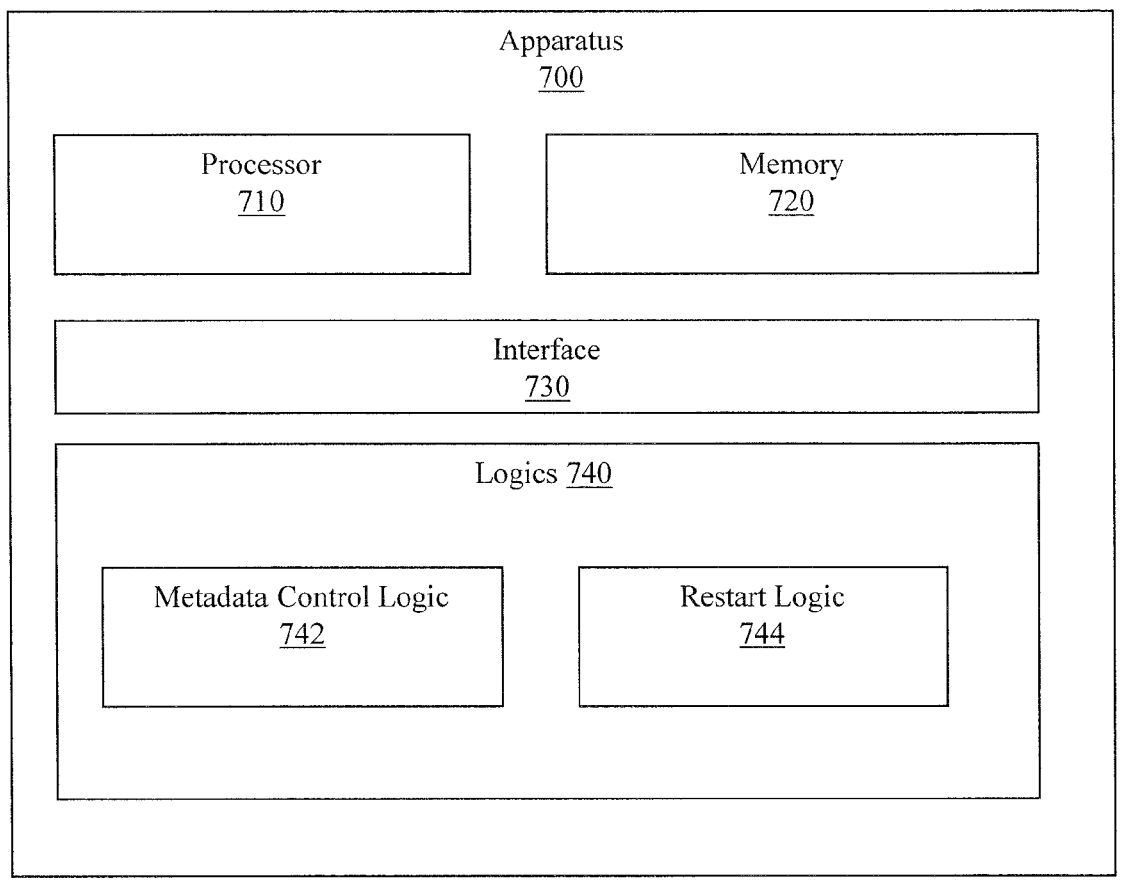
FIG. 7 illustrates an example server associated with reducing the likelihood of an inconsistent state being created by providing front end intelligence for monitoring back end state.

FIG. 7 illustrates an example apparatus 700 associated with reducing the likelihood of an inconsistent state being created by providing front end intelligence for monitoring back end state. Apparatus 700 includes a processor 710, a memory 720, logics 740, and an interface 730 configured to connect the processor 710, the memory 720, and the logics 740. Apparatus 700 may be a back end apparatus (e.g., server apparatus) communicating with and supporting a front end apparatus (e.g., client apparatus 600, FIG. 6) that is relying on apparatus 700 for services in a shared storage device file system.

In one example, the logics 740 include a metadata control logic 742 and a restart logic 744. The metadata control logic 742 may be configured to establish metadata for a file that is being created using a multi-step file creation operation. The metadata may include, for example, file name data, file creation time data, file type date, file location date, file permissions data, file access data, file ownership data, file size data, and other file metadata. The metadata control logic 742 may also be configured to write the metadata to a first location (e.g., volatile memory) that may be susceptible to state loss in the apparatus 700. The metadata may be written to the location as part of a first step that is represented by a first state in the file creation operation. The metadata control logic 742 may also be configured to write the metadata to a second location (e.g., non-volatile storage) that is not susceptible to state loss in the apparatus 700. The second write of the metadata be written as part of a second step that is represented by a second state in the file creation operation. The metadata control logic 742 may also be configured to report the state of the file and the file creation operation to an entity (e.g., apparatus 600, FIG. 6) that requested the file creation operation.

The restart logic 744 may be configured to report loss of state in the apparatus 700. Loss of state may occur if the apparatus 700 loses power, experiences a hardware problem, experiences a software problem, loses connectivity, and so on. The restart logic 744 may also be configured to accept information suitable for restarting the file creation operation from the entity that requested the file creation operation. The entity providing the information suitable for restarting the file creation operation may be the entity to which the apparatus 700 reported the state of the file and the file creation operation.

In one example, the multi-step stateful file system operation includes a first state and a second state. The first state may be a partial file creation completion state and the second state may be a total file creation completion state. In this example, the information suitable for restarting the file creation operation can include, but is not limited to, file metadata, file data, and a sequence number employed by the apparatus to identify the file and the file create operation.

Figure 8:
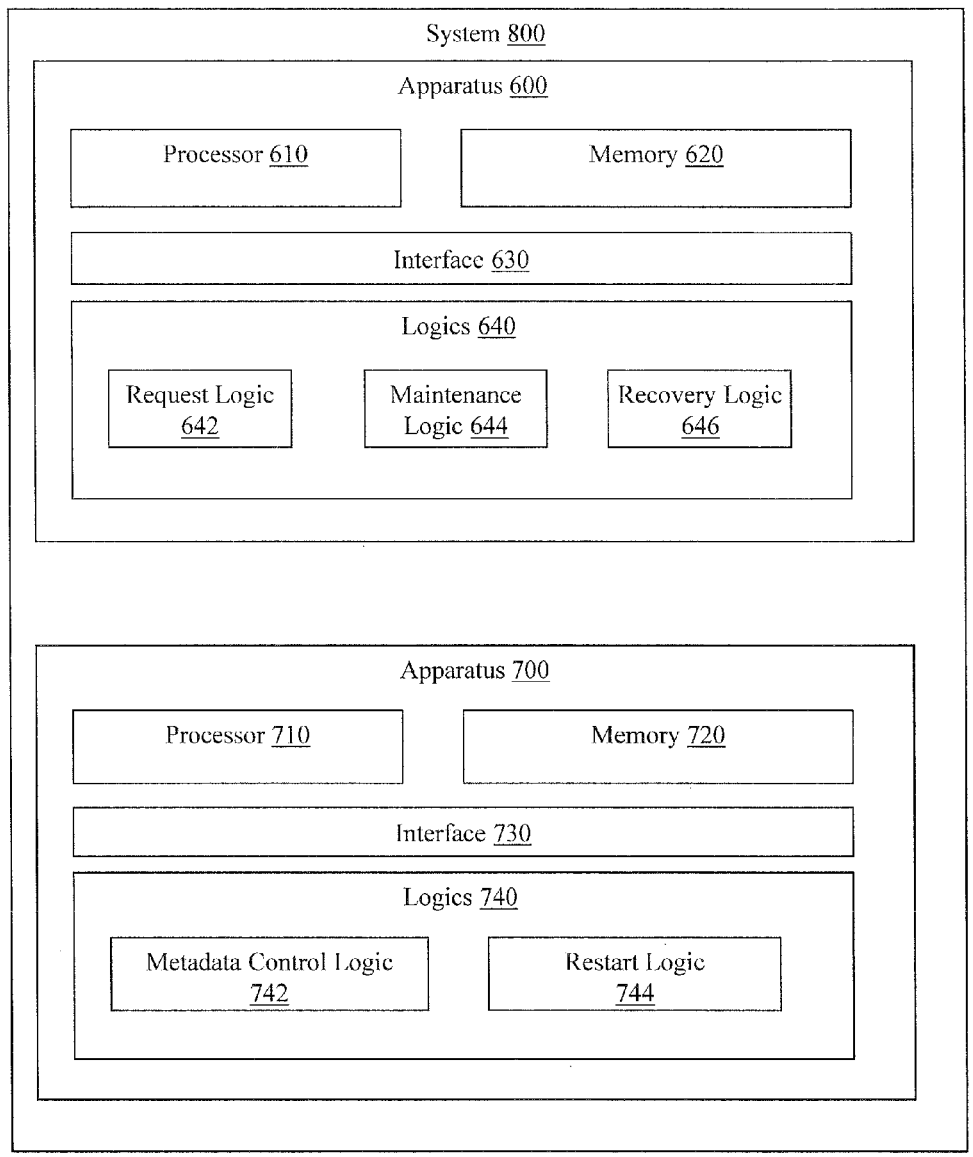
FIG. 8 illustrates an example system associated with reducing the likelihood of an inconsistent state being created by providing front end intelligence for monitoring back end state.

FIG. 8 illustrates an example system 800 associated with reducing the likelihood of an inconsistent state being created by providing front end intelligence for monitoring back end state. System 800 includes both the client apparatus 600 (FIG. 6) and the server apparatus 700 (FIG. 7).

Figure 9:
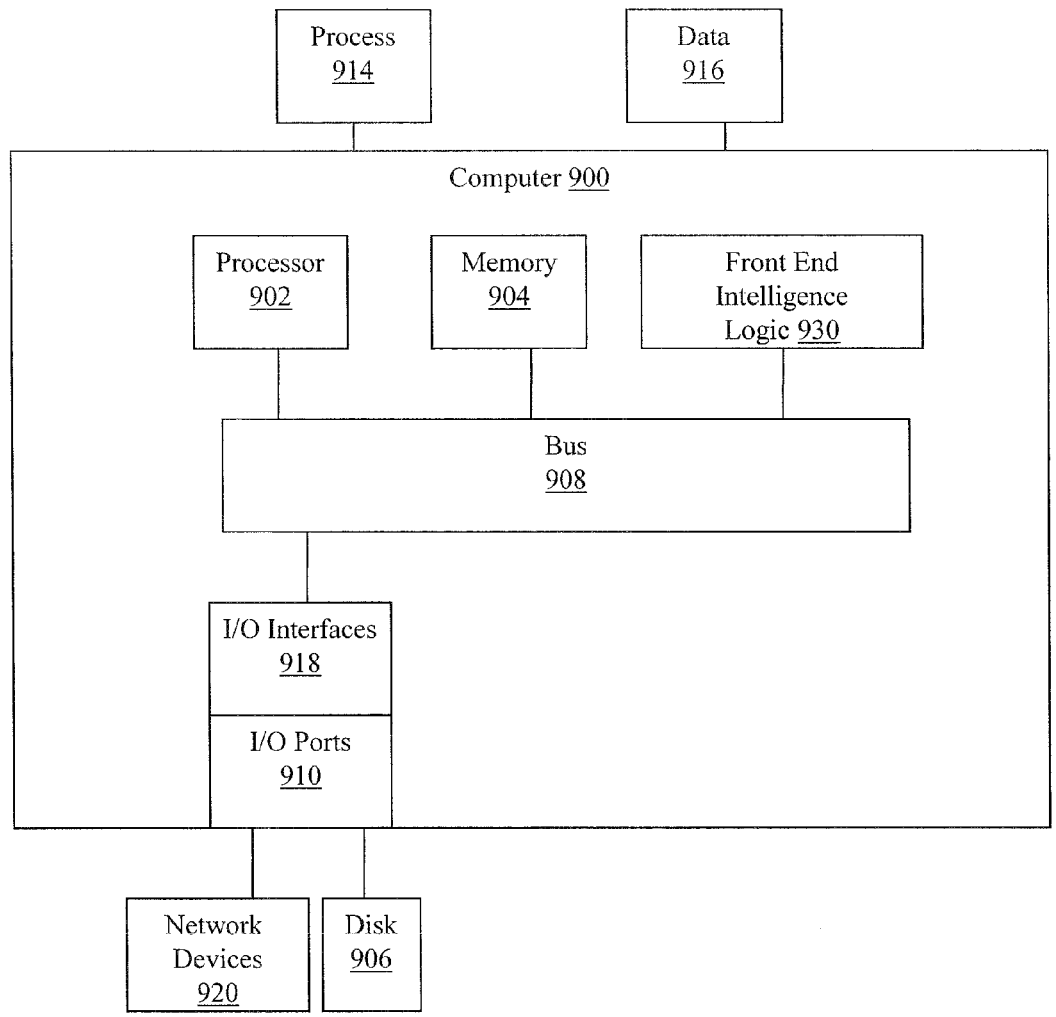
FIG. 9 illustrates an example computing environment in which example systems and methods, and equivalents, may operate.

FIG. 9 illustrates an example computing device in which example systems and methods described herein, and equivalents, may operate. The example computing device may be a computer 900 that includes a processor 902, a memory 904, and input/output ports 910 operably connected by a bus 908. In one example, the computer 900 may include a front end intelligence logic 930 configured to facilitate providing front end intelligence for monitoring back end state in a shared storage device file system. In different examples, the logic 930 may be implemented in hardware, software, firmware, and/or combinations thereof. While the logic 930 is illustrated as a hardware component attached to the bus 908, it is to be appreciated that in one example, the logic 930 could be implemented in the processor 902.

Thus, logic 930 may provide means (e.g., hardware, software, firmware) for monitoring the state in a file creation process of a shared storage device file system. Logic 930 may also provide means (e.g., hardware, software, firmware) for maintaining information useful for re-establishing state for the file creation process of the shared storage device file system. In one embodiment, the information is stored in a location separate from the file creation process of the shared storage device file system. The means associated with logic 930 may be implemented, for example, as an ASIC. The means may also be implemented as computer executable instructions that are presented to computer 900 as data 916 that are temporarily stored in memory 904 and then executed by processor 902.

Generally describing an example configuration of the computer 900, the processor 902 may be a variety of various processors including dual microprocessor and other multiprocessor architectures. A memory 904 may include volatile memory and/or non-volatile memory. Non-volatile memory may include, for example, ROM, PROM, and so on. Volatile memory may include, for example, RAM, SRAM, DRAM, and so on.

A disk 906 may be operably connected to the computer 900 via, for example, an input/output interface (e.g., card, device) 918 and an input/output port 910. The disk 906 may be, for example, a magnetic disk drive, a solid state disk drive, a floppy disk drive, a tape drive, a Zip drive, a flash memory card, a memory stick, and so on. Furthermore, the disk 906 may be a CD-ROM drive, a CD-R drive, a CD-RW drive, a DVD ROM drive, a Blu-Ray drive, an HD-DVD drive, and so on. The memory 904 can store a process 914 and/or a data 916, for example. The disk 906 and/or the memory 904 can store an operating system that controls and allocates resources of the computer 900.

The bus 908 may be a single internal bus interconnect architecture and/or other bus or mesh architectures. While a single bus is illustrated, it is to be appreciated that the computer 900 may communicate with various devices, logics, and peripherals using other busses (e.g., PCIE, 1394, USB, Ethernet). The bus 908 can be types including, for example, a memory bus, a memory controller, a peripheral bus, an external bus, a crossbar switch, and/or a local bus.

The computer 900 may interact with input/output devices via the i/o interfaces 918 and the input/output ports 910. Input/output devices may be, for example, a keyboard, a microphone, a pointing and selection device, cameras, video cards, displays, the disk 906, the network devices 920, and so on. The input/output ports 910 may include, for example, serial ports, parallel ports, and USB ports.

The computer 900 can operate in a network environment and thus may be connected to the network devices 920 via the i/o interfaces 918, and/or the i/o ports 910. Through the network devices 920, the computer 900 may interact with a network. Through the network, the computer 900 may be logically connected to remote computers. Networks with which the computer 900 may interact include, but are not limited to, a LAN, a WAN, and other networks.

The following includes definitions of selected terms employed herein. The definitions include various examples and/or forms of components that fall within the scope of a term and that may be used for implementation. The examples are not intended to be limiting. Both singular and plural forms of terms may be within the definitions.

References to "one embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

ASIC: application specific integrated circuit.
CD: compact disk.
CD-R: CD recordable.
CD-RW: CD rewriteable.
DVD: digital versatile disk and/or digital video disk.
HTTP: hypertext transfer protocol.
LAN: local area network.
PCI: peripheral component interconnect.
PCIE: PCI express.
RAM: random access memory.
DRAM: dynamic RAM.
SRAM: synchronous RAM.
ROM: read only memory.
PROM: programmable ROM.
USB: universal serial bus.
WAN: wide area network.

"Computer component", as used herein, refers to a computer-related entity (e.g., hardware, firmware, software in execution, combinations thereof). Computer components may include, for example, a process running on a processor, a processor, an object, an executable, a thread of execution, and a computer. A computer component(s) may reside within a process and/or thread. A computer component may be localized on one computer and/or may be distributed between multiple computers.

"Computer communication", as used herein, refers to a communication between computing devices (e.g., computer, personal digital assistant, cellular telephone) and can be, for example, a network transfer, a file transfer, an applet transfer, an email, an HTTP transfer, and so on. A computer communication can occur across, for example, a wireless system (e.g., IEEE 802.11), an Ethernet system (e.g., IEEE 802.3), a token ring system (e.g., IEEE 802.5), a LAN, a WAN, a point-to-point system, a circuit switching system, a packet switching system, and so on.

"Computer-readable medium", as used herein, refers to a medium that stores signals, instructions and/or data. A computer-readable medium may take forms, including, but not limited to, non-volatile media, and volatile media. Non-volatile media may include, for example, optical disks, magnetic disks, and so on. Volatile media may include, for example, semiconductor memories, dynamic memory, and so on. Common forms of a computer-readable medium may include, but are not limited to, a floppy disk, a flexible disk, a hard disk, a magnetic tape, other magnetic medium, an ASIC, a CD, other optical medium, a RAM, a ROM, a memory chip or card, a memory stick, and other media from which a computer, a processor or other electronic device can read.

In some examples, "database" is used to refer to a table. In other examples, "database" may be used to refer to a set of tables. In still other examples, "database" may refer to a set of data stores and methods for accessing and/or manipulating those data stores.

"Data store", as used herein, refers to a physical and/or logical entity that can store data. A data store may be, for example, a database, a table, a file, a data structure (e.g. a list, a queue, a heap, a tree) a memory, a register, and so on. In different examples, a data store may reside in one logical and/or physical entity and/or may be distributed between two or more logical and/or physical entities.

"Logic", as used herein, includes but is not limited to hardware, firmware, software in execution on a machine, and/or combinations of each to perform a function(s) or an action(s), and/or to cause a function or action from another logic, method, and/or system. Logic may include a software controlled microprocessor, a discrete logic (e.g., ASIC), an analog circuit, a digital circuit, a programmed logic device, a memory device containing instructions, and so on. Logic may include one or more gates, combinations of gates, or other circuit components. Where multiple logical logics are described, it may be possible to incorporate the multiple logical logics into one physical logic. Similarly, where a single logical logic is described, it may be possible to distribute that single logical logic between multiple physical logics.

An "operable connection", or a connection by which entities are "operably connected", is one in which signals, physical communications, and/or logical communications may be sent and/or received. An operable connection may include a physical interface, an electrical interface, and/or a data interface. An operable connection may include differing combinations of interfaces and/or connections sufficient to allow operable control. For example, two entities can be operably connected to communicate signals to each other directly or through one or more intermediate entities (e.g., processor, operating system, logic, software). Logical and/or physical communication channels can be used to create an operable connection.

"Signal", as used herein, includes but is not limited to, electrical signals, optical signals, analog signals, digital signals, data, computer instructions, processor instructions, messages, a bit, a bit stream, and so on, that can be received, transmitted and/or detected.

"Software", as used herein, includes but is not limited to, one or more executable instructions that cause a computer, processor, or other electronic device to perform functions, actions and/or behave in a desired manner. "Software" does not refer to stored instructions being claimed as stored instructions per se (e.g., a program listing). The instructions may be embodied in various forms including routines, algorithms, modules, methods, threads, and/or programs including separate applications or code from dynamically linked libraries.

"User", as used herein, includes but is not limited to one or more persons, software, logics, computers or other devices, or combinations of these.

While example systems, methods, and so on have been illustrated by describing examples, and while the examples have been described in considerable detail, it is not the intention of the applicants to restrict or in any way limit the scope of the appended claims to such detail. It is, of course, not possible to describe every conceivable combination of components or methodologies for purposes of describing the systems, methods, and so on described herein. Therefore, the invention is not limited to the specific details, the representative apparatus, and illustrative examples shown and described. Thus, this application is intended to embrace alterations, modifications, and variations that fall within the scope of the appended claims.

To the extent that the term "includes" or "including" is employed in the detailed description or the claims, it is intended to be inclusive in a manner similar to the term "comprising" as that term is interpreted when employed as a transitional word in a claim.

To the extent that the term "or" is employed in the detailed description or claims (e.g., A or B) it is intended to mean "A or B or both". When the applicants intend to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (2d. Ed. 1995).

To the extent that the phrase "one or more of, A, B, and C" is employed herein, (e.g., a data store configured to store one or more of, A, B, and C) it is intended to convey the set of possibilities A, B, C, AB, AC, BC, ABC, AAA, AAB, AABB, AABBC, AABBCC, and so on (e.g., the data store may store only A, only B, only C, A&B, A&C, B&C, A&B&C, A&A&A, A&A&B, A&A&B&B, A&A&B&C, A&A&B&B&C&C, and so on). It is not intended to require one of A, one of B, and one of C. When the applicants intend to indicate "at least one of A, at least one of B, and at least one of C", then the phrasing "at least one of A, at least one of B, and at least one of C" will be employed.

What is claimed is:

1. A non-transitory computer-readable medium storing computer-executable instructions that when executed by an apparatus cause the apparatus to perform a method, the method comprising:
   receiving, at a first entity, a first notice from a second entity that a multi-state stateful operation has attained a first state in the second entity, the multi-state stateful operation being a file create operation, the first state being a partial file creation completion state where metadata associated with a file is established by the second entity in a first location that is susceptible to state loss on the second entity;
   upon receiving the first notice, beginning maintenance, at the first entity, of information associated with the stateful operation;
   upon determining that the second entity lost state before the stateful operation attained a second state, selectively providing from the first entity to the second entity a portion of the information maintained at the first entity, the second state being a total file creation completion state where metadata associated with the file is established by the second entity in a second location that is less susceptible to state loss on the second entity than the first location; and
   upon receiving, at the first entity, a second notice from the second entity that the stateful operation has attained the second state in the second entity, terminating maintenance of the information associated with the stateful operation at the first entity.

2. The non-transitory computer-readable medium of claim 1, the method comprising:
   controlling the first entity to request that the second entity perform the multi-state stateful operation.

3. The non-transitory computer-readable medium of claim 1, the first entity being a client configured to use a shared storage device file system, the second entity being a server configured to use the shared storage device file system and to provide a service for the shared storage device file system, the server being configured to perform the stateful operation.

4. The non-transitory computer-readable medium of claim 1, the first entity being a front end configured to use a shared storage device file system, the second entity being a back end configured to use the shared storage device file system and to provide a service for the shared storage device file system, the back end being configured to perform the stateful operation.

5. The non-transitory computer-readable medium of claim 1, the first entity being one of, a front end configured to use a shared storage device file system, a client configured to use the shared storage device file system, and a process configured to use the shared storage device file system, the second entity being one of, a back end configured to use the shared storage device file system, a server configured to use the shared storage device file system, a server process configured to use the shared storage device file system, and a metadata controller configured to manage the shared storage device file system, and to provide a service for the shared storage device file system, the second entity being configured to perform the stateful operation.

6. The non-transitory computer-readable medium of claim 1, where the first notice received from the second entity comprises an identifier of the stateful operation.

7. The non-transitory computer-readable medium of claim 6, the identifier being a sequence number.

8. The non-transitory computer-readable medium of claim 6, where the stateful operation is a file system operation and where the first notice received from the second entity includes metadata describing a file associated with the file system operation.

9. The non-transitory computer-readable medium of claim 6, where the information associated with the stateful operation that is maintained at the first entity includes the identifier.

10. The non-transitory computer-readable medium of claim 9, where the stateful operation is a file system operation and where the information associated with the stateful operation that is maintained at the first entity includes one or more of, metadata describing a file associated with the file system operation, and data associated with the file associated with the file system operation.

11. The non-transitory computer-readable medium of claim 1, where determining that the second entity lost state before the stateful operation attained a second state includes receiving the identity of the last multi-state stateful operation completed by the second entity before the second entity lost state.

12. The non-transitory computer-readable medium of claim 1, where receiving the second notice from the second entity includes receiving one or more of, the identity of the last multi-state stateful operation performed by the second entity, and an identifier of a multi-state stateful operation completed by the second entity.

13. A non-transitory computer-readable medium storing computer-executable instructions that when executed by an apparatus cause the apparatus to perform a method, the method comprising:
    receiving, at a second entity, from a first entity, a request that the second entity perform a multi-state stateful operation, the multi-state stateful operation being a file create operation;
    providing first notice to the first entity from the second entity that the stateful operation has attained a first state;
    providing second notice to the first entity from the second entity that the stateful operation has attained a second state;
    providing failure notice to the first entity from the second entity that the second entity lost state before advancing the stateful operation from the first state to the second state; and
    receiving, at the second entity, from the first entity, information from which the second entity can restart the stateful operation,
        where the first state is a partial file creation completion state where metadata associated with a file is established in volatile memory associated with the second entity and where the first state is susceptible to state loss on the second entity, and
        where the second state is a total file creation completion state where metadata associated with the file is established in a non-volatile storage device associated with the second entity and where the second state is not susceptible to state loss on the second entity.

14. The non-transitory computer-readable medium of claim 13,
    the first entity being one of, a front end configured to use a shared storage device file system, a client configured to use the shared storage device file system, and a process configured to use the shared storage device file system,
    the second entity being one of, a back end configured to use the shared storage device file system, a server configured to use the shared storage device file system, a server process configured to use the shared storage device file system, and a metadata controller configured to manage the shared storage device file system, and to provide a service for the shared storage device file system,
    the second entity being configured to perform the stateful operation.

15. An apparatus, comprising:
    a processor;
    a memory;
    a set of logics; and
    an interface configured to connect the processor, the memory, and the set of logics,
    the set of logics comprising:
    a request logic configured to request that a shared storage device file system server perform a multi-step file system operation on a file, where the file system operation is a file create operation, where the multi-step file system operation includes a first state and a second state,
        where the first state is a partial file creation completion state where metadata associated with a file is established in a first location associated with the server that is susceptible to a problem on the server, and
        where the second state is a total file creation completion state where metadata associated with the file is established in a second location associated with the server that is not susceptible to a problem on the server;
    a maintenance logic configured to maintain information suitable for re-establishing state for the multi-step file system operation in the shared storage device file system server, where the information suitable for re-establishing state comprises:
        file metadata; and
        a sequence number employed by the shared storage device file system server to identify the file and the file system operation; and
    a recovery logic configured to provide the information suitable for re-establishing state to the shared storage device file system server upon determining that the shared storage device file system server lost state before the multi-step file system operation achieved a desired state.

16. The apparatus of claim 15, where maintaining information suitable for re-establishing state for the multi-step file system operation in the shared storage device file system server comprises one or more of, a sequence number associated with the file system operation, metadata describing a file associated with the file system operation, and data associated with the file associated with the file system operation.

17. An apparatus, comprising:
    a processor;
    a memory;
    a set of logics; and
    an interface configured to connect the processor, the memory, and the set of logics,
    the set of logics comprising:
        a metadata control logic configured:
            to establish metadata for a file that is being created using a multi-step file creation operation,
            to write the metadata to a volatile memory that is susceptible to state loss in the apparatus as part of a first state in the file creation operation,
            to write the metadata to a non-volatile storage that is not susceptible to state loss in the apparatus as part of a second state in the file creation operation, and
            to report the state of the file and the file creation operation to an entity that requested the file creation operation; and
        a restart logic configured to report loss of state in the apparatus and to accept information suitable for restarting the file creation operation from the entity that requested the file creation operation and to which the apparatus reported the state of the file and the file creation operation,
where the multi-step stateful file system operation includes a first state and a second state,
where the first state is a partial file creation completion state, and
where the second state is a total file creation completion state,
where the information suitable for restarting the file creation operation comprises one or more of, file metadata, file data, and a sequence number employed by the apparatus to identify the file and the file create operation.

* * * * *

UNITED STATES PATENT AND TRADEMARK OFFICE
CERTIFICATE OF CORRECTION

Page 1 of 1

PATENT NO. : 8,977,590 B2
APPLICATION NO. : 13/267057
DATED : March 10, 2015
INVENTOR(S) : Habermann et al.

It is certified that error appears in the above-identified patent and that said Letters Patent is hereby corrected as shown below:

In the specification,

In Column 7, line 38, delete "that, operation" and insert --that operation--.

In Column 8, line 61, delete "consequence" and insert --consecutive--.

In Column 10, line 53, delete "form" and insert --from--.

In Column 11, line 65, delete "type date" and insert --type data--.

In Column 11, line 65, delete "location date" and insert --location data--.

In Column 12, line 9, delete "data be" and insert --data may be--.

In Column 14, line 46, delete "tree) a" and insert --tree), a--.

Signed and Sealed this
Nineteenth Day of January, 2016

Michelle K. Lee
*Director of the United States Patent and Trademark Office*